United States Patent [19]

Ubert

[11] Patent Number: 4,509,917
[45] Date of Patent: Apr. 9, 1985

[54] DEVICE FOR REMOVING GRATE SCREENINGS

[75] Inventor: Hans-Jürgen Ubert, Hamburg, Fed. Rep. of Germany

[73] Assignee: Claudius Peters AG, Fed. Rep. of Germany

[21] Appl. No.: 492,386

[22] Filed: May 6, 1983

[30] Foreign Application Priority Data

May 13, 1982 [DE] Fed. Rep. of Germany ....... 3217969

[51] Int. Cl.³ .............................................. F23J 1/02
[52] U.S. Cl. ...................................... 432/75; 432/77; 432/2; 110/255
[58] Field of Search ................... 432/77, 2, 50, 75, 74; 110/259, 255

[56] References Cited

U.S. PATENT DOCUMENTS

| | | | |
|---|---|---|---|
| 2,948,630 | 8/1960 | Holm | 432/77 |
| 3,089,688 | 5/1963 | Ostberg | 432/2 |
| 3,304,619 | 2/1967 | Futer | 432/77 |
| 3,469,828 | 9/1969 | Lane | 432/77 |
| 3,666,249 | 5/1972 | MacLeod, Jr. | 432/75 |
| 3,831,291 | 8/1974 | Kayatz | 432/77 |
| 3,855,950 | 12/1974 | Hughes et al. | 110/255 |
| 3,999,744 | 12/1976 | Kotch | 432/75 |

FOREIGN PATENT DOCUMENTS 55-41310  3/1980  Japan .................................... 432/77

Primary Examiner—Henry C. Yuen
Attorney, Agent, or Firm—Eric P. Schellin

[57] ABSTRACT

In clinker coolers with a thrust grate a small part of the material to be cooled falls through the grate. These grate screenings usually are collected in funnels, let out and carried away. These funnels and transporting devices are housed between high, complicated foundations. In this invention these funnels are replaced by a removal device which moves the grate screenings horizontally through a transfer canal. This eliminates the complicated foundations and the control of the emptying device previously used.

2 Claims, 3 Drawing Figures

DEVICE FOR REMOVING GRATE SCREENINGS

FIELD OF THE INVENTION

The invention is a device for removing grate screenings from the cooling air chambers of a thrust grate cooler. The material to be cooled, such as cement clinker, is passed over the thrust grate. Air is blown into the cooling air chambers from below and through the thrust grate causing fine clinker and clinker dust to fall through the thrust grate and settle on the bottom of the cooling air chambers. A device is described which removes the dust accumulation.

BACKGROUND OF THE INVENTION

Thrust grate coolers are used to cool down cement clinker and to recover heat from the heated cooling air. Fine clinker parts which fall through the air supply openings of the grate plates must be caught and carried away.

The cooling air is blown through individual chambers located below the grate and through the air supply openings of the grate plates into the material to be cooled, e.g. cement clinker. It is unavoidable that fine clinker parts also fall through the grate into the individual cooling air chambers. These chambers are under pressure and must be closed, in order that the cooling air does not escape.

In the prior art, funnels closed off with a slide or flap valves were placed under these chambers and the fill state in the funnels was monitored with measuring devices. A partial emptying in a downward direction was performed as needed. The grate screenings were removed by a drag-link conveyor, a drag chain or a conveyor belt which runs under the funnels. Such a customary arrangement is shown in DT-AS No. 19 41 345. The disadvantages of this arrangement reside in the complicated, expensive foundation, the so-called "cellar" which is required to house the funnel apparatus under the cooling air chambers. The cellar sometimes must be blasted into the ground or entails ground water problems.

SUMMARY OF THE INVENTION

The invention has the task of removing the grate screenings in a cooler of the type initially described in such a way that the cellar can be eliminated and in such a way that the seal of the cooling air chambers against pressure is retained.

The invention solves this task as follows: The grate screenings are removed horizontally from the cooling air chambers via a transfer canal for loose material.

In this way the cellar for the drag chain or the conveyor belt for the funnels and the removal parts on the removal pipe of the funnels are eliminated. Most of the complicated foundation and the control of the removal parts are eliminated as well as the monitoring of the fill state in the funnels.

The individual chambers receive horizontal floors on which the grate screenings are collected and over which a thrust beam provided with scoops runs for transporting. The thrust beam pushes the grate screenings laterally out of the cooling chambers. These scoops are suspended in an articulated manner, so that they fold up on the back stroke. The thrust beam could also be replaced by a traction device like a scraper. The folding movement of the scoops can occur automatically or be controlled by force.

The cooling air chambers are under presusre, for which reason a double seal is recommended. The removal openings of the cooling air chambers are closed by non-return doors. The grate screenings back up in front of these doors and seal the opening like a plug. In some instances this seal can be improved by plug formation in a canal closed at the top in which the grate screenings pile up behind the non-return door.

This device also eliminates part of the funnels, the funnel flaps, the drives and their control. In addition, a non-return door without a drive and the thrust device can be used. The conveyor belt no longer runs in the cellar but laterally next to the cooler, where it is more accessible.

These and further operational and constructional characteristics of the invention will be more evident from the detailed description given hereinafter with referral to the figures of the accompanying drawings which illustrate one preferred embodiment by way of non-limiting example.

BRIEF DESCRIPTION OF THE DRAWINGS

The invention is shown in the drawings given as examples and is described in more detail below.

DESCRIPTION OF THE PREFERRED EMBODIMENT

Figure 1:
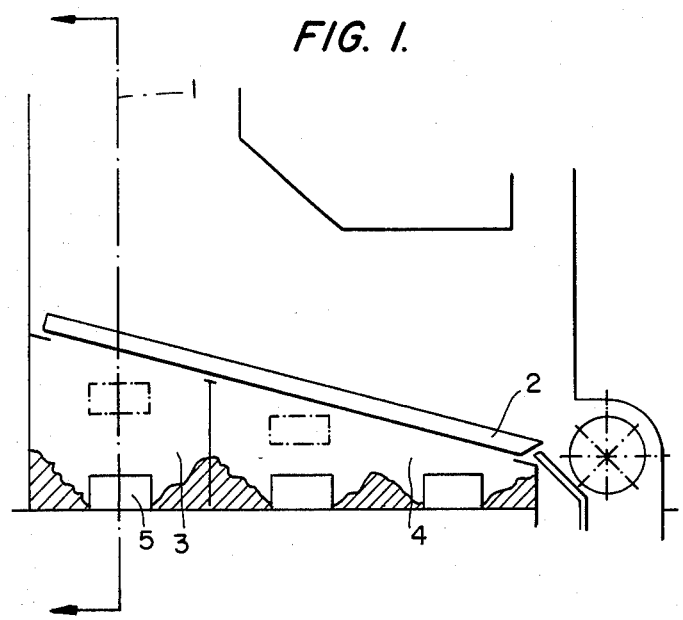
FIG. 1 shows a clinker cooler in longitudinal section.

The clinker cooler shown in a simplified manner in FIG. 1 has the two cooling air chambers 3 and 4 under thrust grate 2 and with opening 5, from which the grate screenings are removed.

Figure 2:
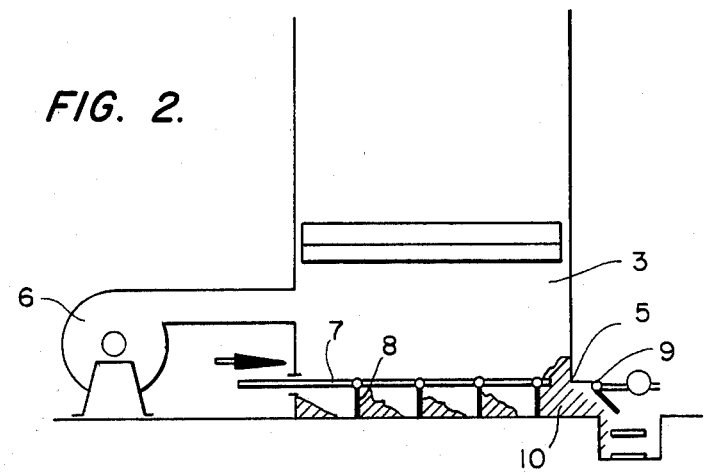
FIG. 2 shows the clinker cooler in cross section at the height of line 1 and the removal device in a work stroke.

FIG. 2 shows cooling air chamber 3 to which ventilator 6 is connected.

Thrust beam 7 runs over the bottom of the chamber and pushes the grate screenings with scoops 8 toward opening 5.

Non-return door 9 together with residue 10 seals the chamber against exiting cooling air. This seal can be improved by plug 11 in a covered canal.

Figure 3:
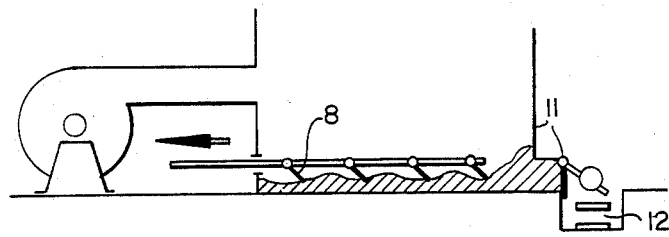
FIG. 3 shows the same cross section with the removal device in a return stroke.

FIG. 3 shows the thrust beam during a return stroke with folded-up scoops 8, which transport nothing in this position and are returned like this to their initial position. The removal grate screenings are carried away by drag chain 12 and are generally mixed at the cooler exit with the removed clinker.

This invention is not limited to the single embodiment heretofore described, to which variation and improvements may be made, consisting of mechanically equivalent modifications to component parts, without having the scope of protection of the present patent, the characteristics of which are summarized in the following claims.

What is claimed is:

1. A device for removing grate screenings from a cooling chamber comprising:
   a transfer channel beneath the grate;
   a removal opening in the side of said cooling chamber which is fitted with a non-return door whereby air pressure is maintained;
   a means for removing the grate screenings horizontally through said transfer channel comprising a thrust beam provided with scoops where said scoops fold about an articulated suspension on the return stroke; and a plug of grate screenings formed in front of the removal opening which aids in maintaining air pressure.

2. A device for removing grate screenings from a cooling chamber comprising:

a transfer channel beneath the grate;

a removal opening in the side of said cooling chamber which is fitted with a non-return door whereby air pressure is maintained;

a means for removing the grate screenings horizontally through said transfer channel comprising a thrust beam provided with scoops where said scoops fold about an articulated suspension on the return stroke; and a plug of grate screenings outside the non-return door backed up over the door whereby the plug aids in maintaining air pressure.

* * * * *